Sept. 25, 1951 S. L. BURGWIN ET AL 2,569,287
MOTOR CONTROL SYSTEM
Filed May 12, 1948
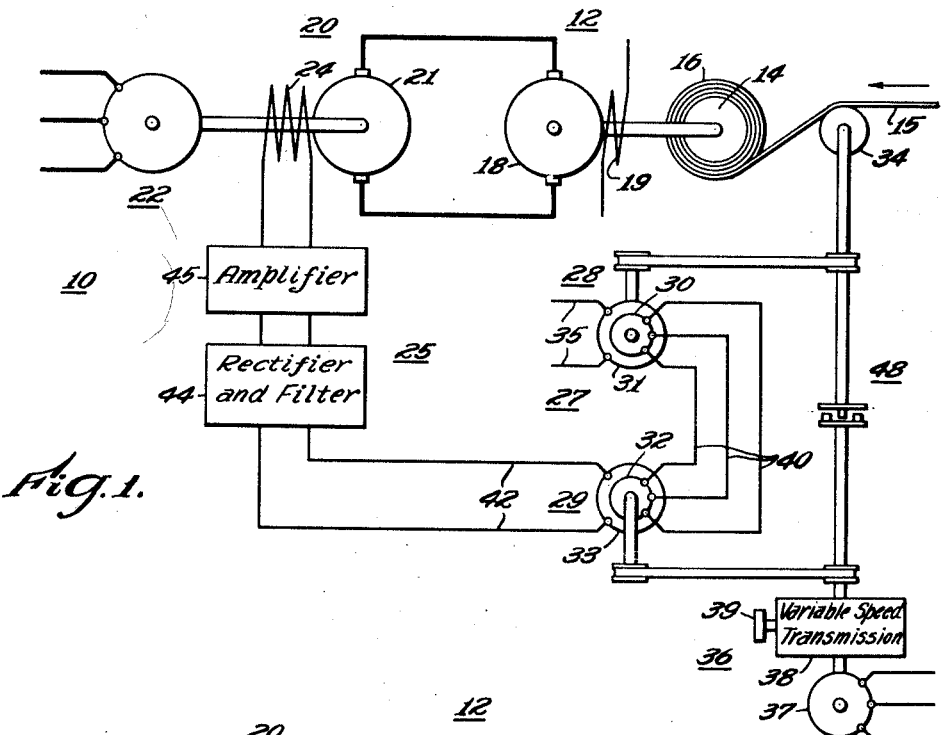
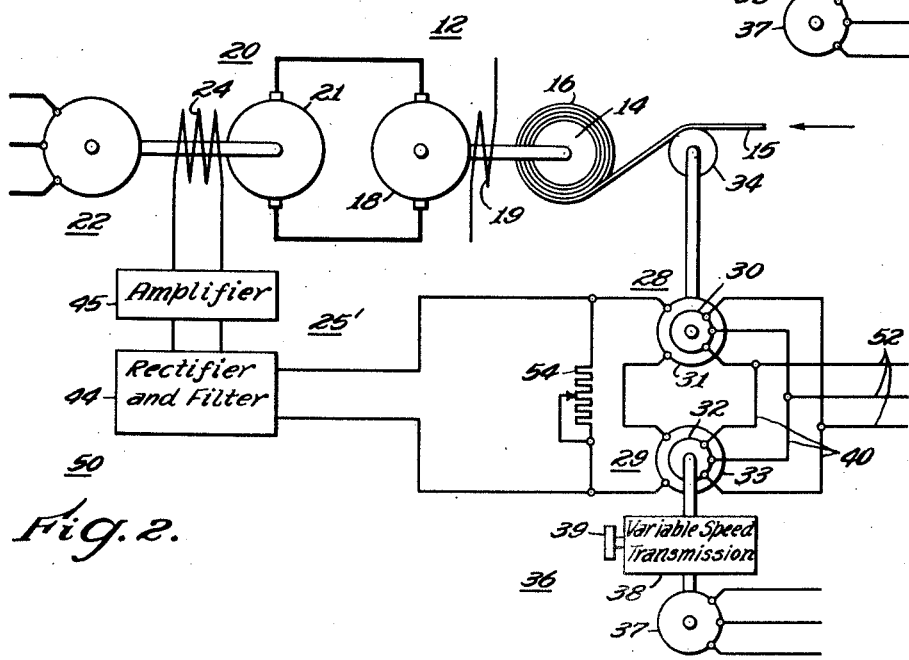
WITNESSES:
Robert A. Baird
F. V. Giolma
INVENTORS
Stephen L. Burgwin and
Frank Vandenberg.
BY
L. M. Crawford
ATTORNEY Patented Sept. 25, 1951

2,569,287

UNITED STATES PATENT OFFICE 2,569,287

MOTOR CONTROL SYSTEM

Stephen L. Burgwin and Frank Vandenberg, East Aurora, N. Y., assignors to Westinghouse Electric Corporation, East Pittsburgh, Pa., a corporation of Pennsylvania Application May 12, 1948, Serial No. 26,587

7 Claims. (Cl. 318—6)

Our invention relates, generally, to control systems, and it has reference in particular to motor control systems such as may be used for regulating the speed of a reel motor or the like for winding a strip material.

Generally stated, it is an object of our invention to provide a control system for regulating the speed of a reel motor, or the like, which is simple and inexpensive to manufacture, and which is reliable and effective in operation.

More specifically, it is an object of our invention to provide, in a control system for a reel motor, for using synchro units responsive to the speed of a strip material and to the speed of a reference device, respectively, for regulating the speed of a strip material.

Another object of our invention is to provide, in a reel motor control system, for utilizing a progressively changing error voltage between two synchro units for controlling the speed of the reel motor so as to maintain a substantially constant strip speed.

A further object of our invention is to provide, in a reel motor control system, for utilizing a synchro system for producing a progressively increasing phase angle error voltage which is used to control the supply of electrical energy to the armature of the reel motor so as to regulate its speed in accordance with a predetermined pattern to compensate for coil build-up on the reel.

It is also an object of our invention to provide a sensitive electronic regulating system which is effective to regulate closely the speed of a strip material, particularly at relatively low values of strip speed.

Yet another object of our invention is to provide, in a reel motor control system, for varying the speed of the reel motor in accordance with an error voltage in a synchro system which is responsive to a difference in phase between synchro units responsive to the strip speed and to the speed of a variable speed reference device, respectively.

An important object of our invention is to provide, in a reel motor control system, for using lost motion means for coupling synchro units responsive to the strip speed and to the speed of a reference motor, respectively, for preventing the synchro units from getting out of step during transient operating conditions.

It is also an important object of our invention to provide, in a reel motor control system, for controlling the speed of the reel motor in accordance with the torque transmitted between synchro units connected in driving relation with the strip and with a reference speed device, respectively.

Another important object of our invention is to provide, in a reel motor control system, for using synchro units responsive to the speed of a strip material and the speed of a variable speed reference device, respectively, and which are coupled by a lost motion coupling device for producing an error voltage which may be used to regulate the speed of the reel motor.

Other objects will, in part, be obvious and will, in part, be explained hereinafter.

In practicing our invention in one of its forms, a strip of material which is being wound on a reel driven by a reel motor, passes over an idler roll as it proceeds relatively slowly from an annealing process, or the like. A synchro unit driven by the idler roll is connected electrically to an additional synchro unit which may be driven at any predetermined speed by a variable speed reference device. The rotors of the two synchro units are connected mechanically by a lost motion coupling device which permits up to approximately 180° mechanical displacement therebetween. The stator of the synchro unit connected to the idler roll is energized from an alternating-current source, and the error voltage produced by a phase displacement between the rotor windings of this synchro unit and the additional synchro unit is rectified and amplified, and then used to progressively vary the output voltage of a generator supplying electrical energy to the armature of the reel motor, so as to progressively reduce the speed thereof and compensate for coil build-up on the reel.

For a more complete understanding of the nature and scope of our invention, reference may be made to the following detailed description, which may be read in connection with the accompanying drawing, in which:

Figure 1 is a diagrammatic view of a reel motor control system embodying the invention in one of its forms; and Fig. 2 is a diagrammatic view of a reel motor control system embodying the invention in another of its forms.

Referring to Figure 1, the reference numeral 10 may denote, generally, a control system for a reel motor 12, which may be connected in driving relation with a reel 14 for winding a strip of material 15 into a coil 16.

The reel motor 12 may be of any suitable type, having an armature 18 and a field winding 19. The field winding 19 may be supplied with electrical energy from a suitable power source having a substantially constant voltage. The armature 18 may be supplied with electrical energy from a variable voltage source such as the generator 20 having an armature 21 connected in driving relation with a motor 22, and a field winding 24.

In order to provide for controlling or regulating the speed of the reel motor 12 in accordance with a predetermined pattern, so as to maintain, for example, the speed of the strip 15 substantially constant notwithstanding the fact that the diameter of the coil 16 continuously increases as the strip is wound on a reel, a regulating system 25 may be provided for controlling the energization of the field winding 24 of the generator. For example, a synchro system 27 may be utilized, comprising a synchro unit 28, and an additional synchro unit 29, having polyphase rotors and single-phase stators 30 and 31, and 32 and 33, respectively. The rotor 30 of the synchro unit 28 may be driven in accordance with the speed of the strip 15, being, for example, connected in driving relation with an idler roll 34 engaging the strip 15 by means of a belt, as shown, or in any other suitable manner. The stator 31 of the synchro unit 28 may be connected to a suitable source of single-phase alternating-current supply, which may be represented by the conductors 35.

The rotor 32 of the additional synchro unit 29 may be connected in driving relation with a reference speed device 36 comprising, for example, a constant speed motor 37 and a variable speed transmission 38, having a control handle 39 operable to provide a variable reference speed for the unit 29. The rotors 30 and 32 may be electrically connected by means of conductors 40, in order to provide an error control voltage which is proportional to the phase displacement or error between the rotors 30 and 32.

The stator voltage appearing across the stator conductors 42 of the additional synchro unit 29 will be proportional to the phase displacement between the rotors of the synchro units. This voltage may be passed through a suitable rectifier and filter circuit 44, amplified by means of an amplifier 45 of any type well-known in the art, and applied to the field winding 24 of the generator. The amplification should be such that the available error voltage will be capable of varying the energization of the field winding from substantially zero to full field conditions within the permissible relative movement of the rotors.

Suitable coupling means 48 may be provided for mechanically connecting the rotors 30 and 32 so as to permit a predetermined amount of displacement therebetween. Assuming that the synchro units are two pole machines, the amount of mechanical displacement permitted by the coupling means 48 would be approximately 180°. This prevents the synchro system from getting out of step as a result of the strip suddenly engaging the idler roll, or losing contact therewith, and permits the use of smaller capacity synchro units. The coupling between the rotors may be so adjusted or set that the error voltage across the stator conductors 42 varies from substantially a maximum in one extreme position when the idler roll 34 lags the maximum amount with respect to the reference speed device 36, to a minimum value at the other extreme position.

When starting the system, the reference speed device 36 will be operated to gradually bring the rotor 32 of the synchro unit 29 up to the desired speed, and to drive the idler roller 34 and rotor 30 through the coupling device 48. Since the coupling device permits the rotor 30 to lag with respect to rotor 32, an error voltage appears across the stator conductors 42 depending upon the degree of lag, and the field winding 24 of the generator is energized, accordingly. The armature 18 of the reel motor is energized therefrom and the reel motor 12 speeds up. Since the maximum lag position of the rotor 30 produces full field on the generator, the reel motor is rapidly brought up to speed and the strip 15 is brought into engagement with the idler roll 34, which then tends to run at strip speed.

In normal operation, the strip 15 drives the idler roll 34 at a speed which is determined by the reference speed device 36 and maintains the coupling device 48 at some point intermediate the two extreme positions so that no torque is being transmitted by the coupling device. The phase displacement of the rotors 30 and 32 will be such as to produce the proper energization of the generator field winding 24 to run the reel motor at the speed necessary to produce the desired strip speed. Should the strip tend to speed up as the coil on the reel increases in diameter, then the rotor 30 of the synchro unit 28 will advance relative to the rotor 32 of the additional synchro unit 29. This change in the relative position of the rotors of the two synchro units decreases the error voltage across the stator conductors 42, resulting in decreased energization of the generator field winding 24. Accordingly, the voltage applied to the armature 18 of the reel motor 12 is reduced, so that the motor slows down until the strip is traveling at the desired speed as determined by the reference speed device 36, but with slightly less lag than before. Normally this action will take place continuously, or in a progressive manner, as the coil diameter increases, the phase angle between the rotors of the synchro units decreasing continuously.

Should the speed of the strip tend to drop below the desired value as determined by the device 36, the error voltage increases, thus causing the voltage applied to the armature of the reel motor 12 to be increased, thereby speeding up the motor and restoring the speed of the strip to the desired value. The speed of the strip can be readily changed through adjustment of the variable speed transmission 38, which changes the angular relation or displacement of the rotors 30 and 32, and causes the speed of the reel motor to change correspondingly. The coupling device 48 prevents the synchro units from getting out of step as a result of abrupt transient conditions.

Referring to Fig. 2, the reference numeral 50 may denote, generally, a reel motor control system which is generally similar to the system of Fig. 1 except that the regulating system 25' is of a different form or arrangement. As in Fig. 1, the reel motor 12 is connected in driving relation with a reel 14 for winding a strip of material 15 into a coil 16, and is provided with an armature 18 and a field winding 19. The field winding 19 is energized from a power source of substantially constant voltage, while the armature 18 is supplied with electrical energy from the variable voltage generator 20 having an armature 21 and a field winding 24, the generator being driven by the alternating-current motor 22.

Instead of utilizing mechanically coupled synchro units as shown in Fig. 1, the synchro units 28 and 29 may be connected for the electrical transmission of torque and utilized to control the energization of the reel motor armature in accordance with the torque transmitted between the reference speed device 36 and the idler roll 34. For example, the rotors 30 and 32 may be electrically connected together by conductors 40 and connected to a suitable polyphase source of alternating current by means of conductors 52. The stators 31 and 33 may be connected in series-circuit relation across a suitable variable control resistor 54, so as to produce a phase error control voltage proportional to the torque transmitted between the synchro units. The voltage appearing across the resistor 54 may be applied to the rectifier and filter circuit 44 and then amplified by the amplifier 45, and applied to the field winding 24 of the generator 20. The rate of response of the system should be high enough, and the synchro system should be sufficiently "stiff" that the amplified error voltage is effective to vary the speed of the reel motor in the proper direction without permitting the phase angle to increase to the point where the units get out of step, or decrase to the point where the phase of the error voltage reverses.

In operation, when the reel motor is first started, the strip does not engage the idler roll 34, which will be driven by the motor 37 through the synchro system. A voltage appears across the resistor 54, which is amplified and applied to the field winding 24 of the generator 20, causing the reel motor to accelerate to the desired speed as determined by the reference speed device 36. Since no torque is transmitted when the rotors of the synchro units 28 and 29 are in exactly the same phase relation, the amount of torque transmitted between the unit 29 and the unit 28 will vary between a maximum and substantially zero, and will level off at a value which produces the generator voltage necessary to operate the reel motor to wind the strip at the desired speed.

When the strip engages the roll 34, the energization of the field winding 24 will not change if the peripheral speed of the roll is the same as the strip speed. Should the speed of the strip 15 be greater than the peripheral speed of the roll, the transmitted torque will decrease rapidly, and the voltage applied to the armature 18 of the reel motor will decrease. This slows the reel motor down until a balance is reached. If the strip speed is less than the peripheral roll speed, the reel motor is speeded up.

As the diameter of the coil 16 increases, the rotor 30 of the synchro unit 28 will tend to advance relative to the rotor 32 of the other synchro unit and the torque transmitted by the rotor 32 to the rotor 30 decreases. Accordingly, the current through the resistor 54, which is proportional to the torque transmitted from the synchro unit 28 to the synchro unit 29, decreases. The voltage across the control resistor 54, which is rectified and amplified and applied to the field winding 24 is also reduced. This reduces the output voltage of the generator 20, and slows down the reel motor 12 to maintain the speed of the strip 15 as the desired value. The transmitted torque between the synchro units 29 and 28 will, therefore, decrease progressively as the diameter of the coil increases, and the phase angle between the rotors 30 and 32 will also decrease, while the rotors run in step.

From the above description and the accompanying drawing, it will be apparent that we have provided a reel motor control system embodying a speed regulating system wherein the special coupling insures that the two synchro units never get out of synchronism. Whenever the strip is cut, the tension is immediately reduced and the idler roll slows down, causing the regulating system to effect a speeding up of the reel motor. This is desirable since it is necessary to wind up the loose end of the strip as quickly as possible, preparatory to removing the coil from the reel and getting ready to start another coil. In addition, when the strip is first wrapped on the empty reel, the tension is exceedingly low, so that the idler roll is driven by the reference motor and the regulating system calls for maximum speed of the motor, so that the slack in the strip is promptly taken up. By utilizing a reel motor control system embodying the invention in the second of the forms hereinbefore described, no mechanical connection is required between the synchro units, thus providing a much more flexible control system wherein the synchro units may be mounted remotely from each other if desired.

Since certain changes may be made in the above-described construction, and different embodiments of the invention may be made without departing from the spirit and scope thereof, it is intended that all the matter contained in the above description and shown in the accompanying drawing shall be considered as illustrative and not in a limiting sense.

We claim as our invention:

1. A control system for a motor having a driving connection with a strip of material comprising, a synchro system including synchro units having movable elements respectively connected to be driven by and in accordance with the speed of the strip and to a reference motor, said units being electrically connected to produce a voltage proportional to a deviation between the relative positions of the movable elements, and circuit means connected to energize the motor in accordance with said voltage.

2. A control system for a reel motor having a driving connection with a strip of material comprising, position regulating means including a synchro unit connected in driving relation with the strip, an additional synchro unit disposed to be driven at predetermined variable speed, circuit means connecting one of the synchro units to a source of alternating current, additional circuit means electrically connecting the synchro units together so that the other synchro unit produces an error voltage dependent on a difference in mechanical phase relation between the units, and control means operable to energize the reel motor in accordance with said error voltage.

3. In a control system for a motor driving a reel for winding a strip of material, position regulating means including a synchro unit driven in accordance with the strip speed, an additional synchro unit driven by a reference speed device, one of said synchro units being energized from a source of alternating current and connected to the other unit for producing an error voltage dependent upon the angular phase relations between the units, and control means connected to rectify and amplify the error voltage and control energization of the reel motor in accordance therewith.

4. In a control system for a reel motor having a driving connection with a strip of material, a synchro unit having a driving connection with the strip material, an additional synchro unit driven by a reference speed motor, lost motion coupling means connecting the synchro units to provide for a variable phase displacement therebetween, circuit means connecting one of the synchro units to an alternating-current source and the two units together so as to produce an error voltage proportional to the phase displacement of the units, and control means including rectifying means and amplifying means for controlling the reel motor in response to the error voltage.

5. A control system for a reel motor having a driving connection with a strip of material comprising, a synchro unit having a single-phase stator energized from a single-phase source and a polyphase rotor driven by a roll engaging the strip material, an additional synchro unit having a single-phase stator and a polyphase rotor driven by a variable speed reference motor and connected to the rotor of the first-mentioned synchro unit for producing an error voltage in the stator of the additional unit, lost motion means connecting the rotors to provide for up to substantially 180° displacement therebetween, a generator connected to supply electrical energy to the reel motor, and control means including rectifier means and amplifying means connected to control the output of the generator over substantially its entire operating range in accordance with the error voltage of the stator of the additional synchro unit.

6. A control system for a motor having a driving connection with a strip of material comprising, a position regulating system including a synchro unit connected to be driven by the strip of material and an additional synchro unit having a driving connection with a reference speed motor, said synchro units being electrically connected to produce an error voltage dependent on a change in the mechanical phase angle between the units, and control means including a generator responsive to the magnitude of the error voltage connected to supply electrical energy to the motor so as to tend to reduce said phase angle.

7. In a control system for a motor driving a reel handling a strip of material, a position regulator including a synchro unit connected to be driven in accordance with the speed of the strip by a roll engaging the strip of material, an additional synchro unit connected to a variable speed reference speed device, said synchro units being connected electrically to transmit torque, and control means producing a unidirectional voltage proportional to the transmitted torque connected to effect energization of the motor to vary the torque and maintain the speed of the strip in accordance with the speed of the reference device.

STEPHEN L. BURGWIN.
FRANK VANDENBERG.

REFERENCES CITED

The following references are of record in the file of this patent:

UNITED STATES PATENTS

| Number | Name | Date |
| --- | --- | --- |
| 1,801,598 | Evans | Apr. 21, 1931 |
| 1,991,088 | Forbes | Feb. 12, 1935 |
| 2,169,016 | Baker | Aug. 9, 1939 |
| 2,223,718 | Cook | Dec. 3, 1940 |